United States Patent
Kim et al.

(10) Patent No.: US 12,335,278 B2
(45) Date of Patent: Jun. 17, 2025

(54) SYSTEM AND METHOD FOR DETECTING INTRUSION INTO IN-VEHICLE NETWORK

(71) Applicants: Hyundai Motor Company, Seoul (KR); Kia Corporation, Seoul (KR)

(72) Inventors: Tae Guen Kim, Osan-si (KR); A Ram Cho, Yongin-si (KR); Seung Wook Park, Yongin-si (KR); Wha Pyeong Lim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 271 days.

(21) Appl. No.: 17/799,534

(22) PCT Filed: Feb. 10, 2021

(86) PCT No.: PCT/KR2021/001826
§ 371 (c)(1),
(2) Date: Aug. 12, 2022

(87) PCT Pub. No.: WO2021/162473
PCT Pub. Date: Aug. 19, 2021

(65) Prior Publication Data
US 2023/0109507 A1    Apr. 6, 2023

(30) Foreign Application Priority Data

Feb. 14, 2020  (KR) .................. 10-2020-0018611
Feb. 10, 2021  (KR) .................. 10-2021-0019258

(51) Int. Cl.
*H04L 9/40*    (2022.01)
*B60W 50/04*    (2006.01)

(52) U.S. Cl.
CPC .......... *H04L 63/1416* (2013.01); *B60W 50/04* (2013.01); *H04L 63/1433* (2013.01)

(58) Field of Classification Search
CPC . H04L 63/1433; H04L 63/1416; H04L 12/40; B60W 50/04; B60R 25/30
See application file for complete search history.

(56) References Cited

U.S. PATENT DOCUMENTS 10,168,703 B1 * 1/2019 Konrardy .......... G01C 21/3453
2014/0310075 A1 * 10/2014 Ricci .................. G06F 16/252
705/13

(Continued)

FOREIGN PATENT DOCUMENTS

CN    109117639 A    1/2019
JP    2018190465 A    11/2018

(Continued)

*Primary Examiner* — Khoi V Le
(74) *Attorney, Agent, or Firm* — Slater Matsil, LLP

(57) ABSTRACT

An embodiment intrusion detection system for detecting intrusions in an in-vehicle network includes a message queue module configured to store network messages collected from the in-vehicle network in a message queue, a memory configured to securely store a ruleset comprising a set of detection rules used in a plurality of detection techniques, a rule engine configured to apply the plurality of detection techniques to the collected network messages to detect security events and configured to determine a severity score and a reliability score for each detected security event, and an interface manager configured to transmit detection reports to a remote backend server in response to detection of the security events.

19 Claims, 5 Drawing Sheets

(56) References Cited

U.S. PATENT DOCUMENTS

| | | |
|---|---|---|
| 2016/0308887 A1 | 10/2016 | Jung et al. |
| 2017/0034023 A1* | 2/2017 | Nickolov ............ H04L 43/0817 |
| 2018/0255082 A1 | 9/2018 | Ostergaard |
| 2018/0300477 A1 | 10/2018 | Galula et al. |
| 2019/0182267 A1 | 6/2019 | Aher et al. |
| 2019/0306180 A1 | 10/2019 | Dyakin et al. |
| 2019/0349394 A1 | 11/2019 | Kishikawa et al. |
| 2020/0053112 A1* | 2/2020 | Torisaki .............. H04L 63/1425 |
| 2020/0334470 A1* | 10/2020 | Abeykoon ............ G06V 10/96 |
| 2021/0075807 A1 | 3/2021 | Park et al. |
| 2023/0247038 A1 | 8/2023 | Haga et al. |
| 2024/0250976 A1 | 7/2024 | Haga et al. |

FOREIGN PATENT DOCUMENTS

| | | |
|---|---|---|
| JP | 2019194830 A | 11/2019 |
| KR | 101638613 B1 | 7/2016 |
| KR | 20180021287 A | 3/2018 |
| KR | 101902823 B1 | 10/2018 |
| WO | 2017104112 A1 | 6/2017 |
| WO | 2019146976 A1 | 8/2019 |
| WO | 2019231135 A1 | 12/2019 |

\* cited by examiner

SYSTEM AND METHOD FOR DETECTING INTRUSION INTO IN-VEHICLE NETWORK

CROSS-REFERENCE TO RELATED APPLICATIONS

This application is a national stage application of International Application No. PCT/KR2021/001826, filed on Feb. 10, 2021, which claims priority to Korean Patent Application No. 10-2020-0018611, filed on Feb. 14, 2020, and Korean Patent Application No. 10-2021-0019258, filed on Feb. 10, 2021, which applications are hereby incorporated herein by reference.

TECHNICAL FIELD

The present disclosure relates to detection of intrusion into an in-vehicle network.

BACKGROUND

The statements in this section merely provide background information related to the present disclosure and do not necessarily constitute prior art. Intrusion Detection System (IDS) and Intrusion Prevention System (IPS) have been widely used in network security. The IDS monitors network activity and detects suspicious behavior. The IPS refers to a system that has the function or capability of the IPS to respond to a detected intrusion by, for example, blocking a signal that may affect the system.

An ever-increasing number of electronic control units (ECUs) are mounted within a vehicle which in turn connects via wired and wireless networks to an external network, and in concert therewith, the IDS is provided to detect and respond to the security threat to the internal network of the vehicle.

SUMMARY

Embodiments of the present disclosure propose efficient operation methods of a plurality of detection techniques that can reduce required system resources while maintaining the architecture of an intrusion detection system (IDS) suitable for mounting on a vehicle and robustness against attack message or security event detection. In addition, embodiments of the present disclosure provide methods of judging the severity and reliability of a detected security event and determining an action for the detected event based on the judgment.

At least one embodiment of the present disclosure provides an intrusion detection system which detects intrusions in an in-vehicle network. The intrusion detection system comprises a message queue module for storing network messages collected from the in-vehicle network in a message queue and a memory for securely storing a ruleset which is a set of detection rules used in a plurality of detection techniques. The intrusion detection system further comprises a rule engine configured to apply the plurality of detection techniques to the collected network messages to detect security events and configured to determine a severity score and a reliability score for each detected security event, and an interface manager for transmitting detection reports to a remote backend server in response to detection of the security events.

In the various embodiments, the intrusion detection system may further include one or more of the following features.

In some embodiments, the severity score is a value indicating how dangerous a relevant security event is to the safety of a vehicle or a driver and the severity score may be determined based on a predefined importance level for the detection rule that succeeded in detecting the relevant security event.

In some embodiments, the reliability score is a value indicating a likelihood that a relevant security event is an actual attack and the reliability score may be determined based on a difference between characteristics of the relevant security event and normal characteristics of the in-vehicle network. For example, for security events in which network messages are transmitted on the in-vehicle network at a period different from a normal transmission period, the reliability score may be determined based on a deviation from the normal transmission period.

In some embodiments, the rule engine may determine an action for a relevant security event based on the severity score and the reliability score.

In some embodiments, the interface manager may determine a transmission order or a transmission timing of the detection reports based on the severity score and the reliability score.

In some embodiments, the interface manager may be configured to prioritize relevant security events based on the severity score and the reliability score and to forward the detection reports to the backend server in real time for security events with a priority higher than a predefined value. The interface manager may also be configured to forward detection reports to the backend server during an idle time for security events with a priority equal to or lower than the predefined value.

In some embodiments, the interface manager may be configured to transmit the detection reports to the backend server in the order of detection of the security events. The interface manager may also be configured to, when a plurality of security events are detected in a predefined period of time, determine a priority for each security event based on the severity score and the reliability score, and to transmit a detection report for each security event to the backend server according to the priority.

At least one embodiment of the present disclosure provides a method performed by an intrusion detection system for detecting intrusion in an in-vehicle network. The method comprises storing network messages collected from the in-vehicle network in a message queue and applying a plurality of detection techniques to the collected network messages to detect security events. The plurality of detection techniques uses a ruleset which is a set of detection rules. The method further comprises determining a severity score and a reliability score for each detected security event and transmitting detection reports to a remote backend server in response to detection of the security events.

The intrusion detection system and the method enable rapid response to threatening attacks in a vehicle environment with limited processing power and limited network bandwidth.

DETAILED DESCRIPTION OF ILLUSTRATIVE EMBODIMENTS

Figure 1:
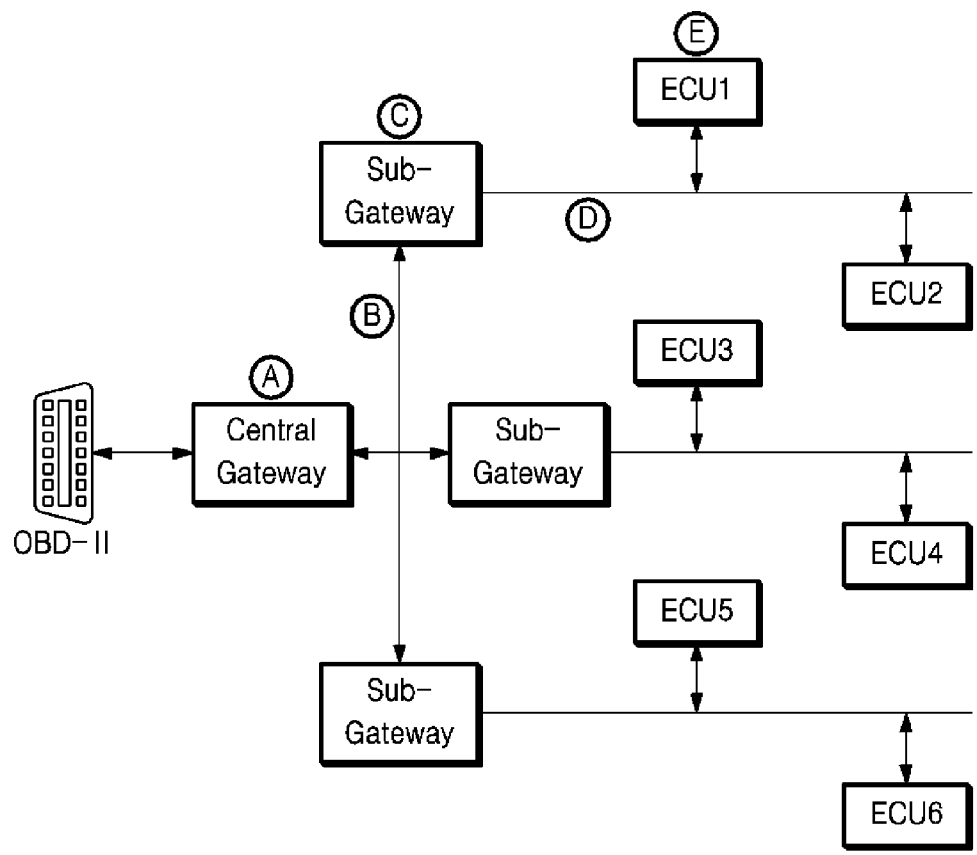
FIG. 1 illustrates locations at which an IDS may be disposed on a CAN network.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

FIG. 1 illustrates locations such as Ⓐ, Ⓑ, ©, Ⓓ, and Ⓔ at which an IDS (Intrusion Detection System) may be deployed on a controller area network (CAN). A central gateway (CGW) shown is a central communication node that serves as a router for transferring data between various domains within a vehicle and serves as a gate for communications between an external network and an in-vehicle network. The central gateway (CGW) may be viewed as a gate for all data coming into the vehicle. Sub-gateways are local communication nodes that are each responsible for a particular functional domain, such as a power train, chassis, body, infotainment, etc. FIG. 1 presupposes that electronic control units (ECUs) are connected to a CAN bus in the respective functional domains, although the ECUs may be connected to a bus using other communication protocols (e.g., LIN, FlexRay, Ethernet, etc.) in some functional domains.

The merits and issues of the respective locations are as follows.

Ⓐ At central gateway: Where all CAN domains connect to the outside, an IDS may be installed to detect all attacks coming into the network CAN via an OBD port. This allows for identification of a message having an intention of attack in advance before affecting the CAN. However, with excessive messages to process data being collected in comparison with other locations, the IDS location is difficult to effectively cope with an attack due to the difficulty of distinguishing an intrusive attack to an internal network from a nonintrusive message.

Ⓑ After central gateway: An IDS may check the message after filtering by the central gateway. This allows for detection of attackers that are fewer, but more determined than before passing through location Ⓐ. In addition, this allows for detection of hacking by an external hacker directly accessing the backbone network CAN and injecting a malicious message.

© At sub-gateway: Where management is performed on CAN messages that are transmitted and received to and from a specific CAN domain, an IDS may be installed to more easily detect a discrepancy between a CAN message at Ⓑ and a CAN message flowing in the specific CAN domain. At this location for detecting an attack directed to another domain from inside the CAN domain, the IDS may detect an attacker inside the CAN domain with a high level of success.

Ⓓ After sub-gateway: Where hacking of the system is more difficult through double gateways with a specific malicious message. However, when an internal ECU (electronic control unit) has been damaged by an attacker, or when a malicious ECU has been introduced and spoofed as a replacement, and when an external entity directly connects to the CAN bus in a domain, a malicious message is still capable of being transmitted to the CAN bus in that domain. Therefore, this installation location may be considered when the internal ECU is not reliable and monitoring is needed against a network hacking of a specific CAN domain to which the ECU belongs.

Ⓔ E Mounting on ECU: The ECU receives all messages present on the network and selectively processes the required messages by checking the IDs of the necessary CAN messages. The control unit analyzes the contexts of the CAN status message and a CAN command message received from the outside of the control unit and implements the messages. Therefore, the ECU requires a high level of security due to requiring protection from both the outside and the inside thereof. Mounting the IDS on the ECU prevents loss of critical data possessed by the ECU or a malfunction against a highly sophisticated internal/external attacker capable of falsifying the ECU.

A plurality of IDS systems may be equipped in at least one of such locations Ⓐ, Ⓑ, ©, Ⓓ, and Ⓔ at which the IDS systems may be placed as illustrated in FIG. 1. For example, the IDS systems may be embedded on the central gateway and the plurality of sub-gateways, respectively, and the IDS systems may be embedded on the central gateway and the main ECU, respectively. In addition, each domain may be embedded with a dedicated electronic control unit that performs monitoring in its domain level. These IDS systems may complementarily monitor the network and detect an attempted attack, thereby enhancing the security of the vehicle network.

Figure 2:
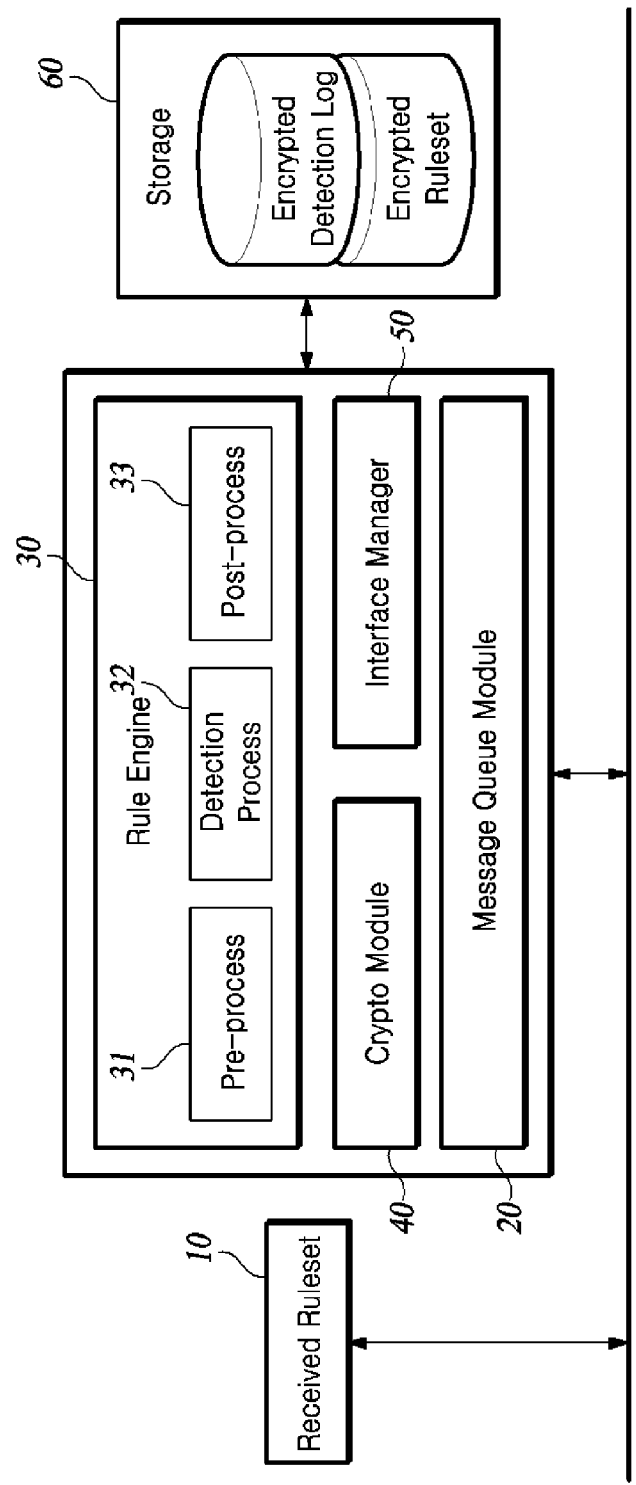
FIG. 2 is a functional block diagram of an IDS for detecting a security event in an in-vehicle network according to one embodiment of the present disclosure.

FIG. 2 is a functional block diagram of an intrusion detection system (IDS) for detecting a security event in an in-vehicle network according to at least one embodiment of the present disclosure.

As illustrated in FIG. 2, an IDS may include a message queue module 20, a rule engine 30, a crypto module 40, an interface manager 50, and a storage (i.e., memory) 60. The IDS illustrated in FIG. 2 may be implemented as a dedicated electronic control unit(s) which is embedded in the gateway(s) or ECU(s) illustrated in FIG. 1 or linked to the in-vehicle network.

The message queue module 20 stores, in a message queue, all the CAN traffic data collected by the CAN bus. The request of other modules of the IDS for the collected traffic data is processed by the message queue module 20.

The rule engine (or also called a 'detection engine') 30 is a module that operates as a detector and responder that is an essential function of the IDS. The function of the rule engine 30 may be broadly divided into a pre-process 31, a detection process 32, and a post-process 33.

In the pre-process 31, the rule engine 30 updates the ruleset stored in the storage 60 with a detection ruleset 10 which may be obtained through various means (e.g., a backend server, a USB memory stick, an SD card, etc.), or resets the IDS. The detection ruleset is a set of predefined rules used by a plurality of detection techniques performed in the detection process to detect network messages related to security threats. In the detection process 32, the rule engine 30 detects the occurrence of a security event by detecting a network message related to a security threat while driving, using the plurality of detection techniques. In the post-process 33, the rule engine 30 determines how to handle the detected security threat message. For example, the detected malicious message may be dropped or logged, or an alarm may be generated. When a security event occurs (i.e., when a security threat message is detected), the rule engine 30 may determine a severity score and a reliability score for the security event.

The crypto module 40 encrypts or decrypts the ruleset and a detection log, and manages relevant keys.

The interface manager 50 manages a communication connection with the back-end server in order to download a new ruleset 10 from the backend server or transmit a detection log or a detection result to the backend server. The detection ruleset and the detection log are encrypted by the encryption engine and stored safely in the storage 60 (e.g., flash memory). The storage 60 may be provided by another node on the in-vehicle network. In this case, the interface manager 50 may also manage a communication connection with the storage 60 located in another node.

Figure 3:
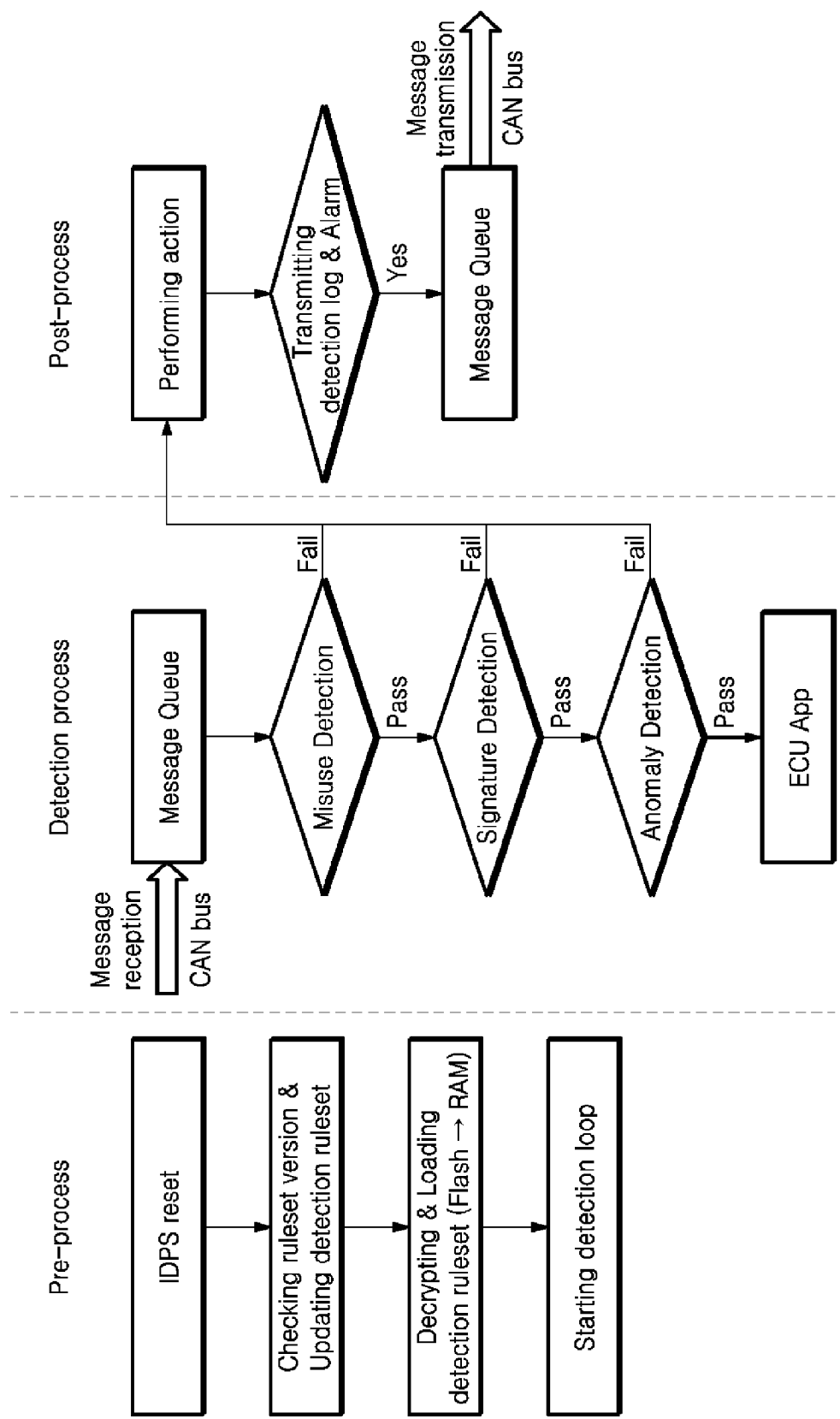
FIG. 3 is a flowchart illustrating an exemplary operation of an IDS according to one embodiment of the present disclosure.

FIG. 3 is a flowchart illustrating an exemplary operation of the IDS according to one embodiment of the present disclosure.

The IDS may be configured to perform the pre-process when the vehicle is activated, and then repeat the detection process and the post-process until the vehicle is deactivated.

In the pre-process, when the IDS is reset, it checks the version of the detection ruleset and may be updated to the latest version of the detection ruleset, for example, downloaded via OTA (Over-the-Air) or received via the OBD port when the detection ruleset currently stored in the storage is not the latest version. Thereafter, the IDS decrypts the encrypted ruleset stored in the storage and loads it into the internal memory RAM. When the pre-process ends, the detection process, which is the actual detection action of the IDS, begins.

In the detection process, when a new CAN message arrives in the message queue, the IDS may sequentially perform misuse detection, signature detection, and anomaly detection to determine whether the new CAN message is a network message related to a security threat (hereinafter referred to also as a 'security threat message', 'abnormal message', 'malicious message', or 'attack message').

In the post-process, actions such as passing, blocking, logging, or warning are executed based on the inspection results for CAN messages. When a security event occurs (i.e., when a security threat message is detected), the IDS may identify the source of the attack, classify the severity of the attack, or analyze the impact on functional safety. The IDS may also send messages containing a detection log (hereinafter referred to as a 'detection report' or a 'detection report message') through the CAN network (or through a separate communication line) to a gateway or a telematics device that may be communicatively connected to a remote network, so that the detection log for the security event is transmitted to the backend server on the remote network, for example.

The characteristics, merits, and issues of the intrusion detection technique described above are as follows.

The misuse detection is a technique that checks the validity of a CAN message by comparing the ID of the CAN message, the length of the CAN message (Data length code: DLC), and the message transmission period with values specified in a CAN database. That is, in the misuse detection, the collected CAN message is checked according to pre-defined rules whether it conforms to the 'valid message format' predetermined by the manufacturer.

The misuse detection consumes less system resources than the signature detection and the anomaly detection. However, the validity check alone is impossible to detect malicious data and others in the message.

The signature detection is a technique that detects attack patterns predefined (i.e., known) through vulnerability analysis for the vehicle system. Such attack patterns are also called signatures. The signature detection determines whether the collected message is a malicious message by checking a black list containing signatures of malicious messages without considering the status of the vehicle.

The signature detection consumes fewer system resources and has a high detection probability. However, since a new signature needs to be defined for each new attack, a lot of time and security human resources are required to cope with a newly emerged attack. This technique may cause a false negative (type 2 error) problem that may miss real attacks.

The anomaly detection is a technique that determines whether a corresponding message is within a normal message category based on the status of the vehicle and is performed according to the detection rules based on the status of the vehicle and command messages. The anomaly detection is a technique that collects and analyzes general behaviors on a CAN network to define normal patterns (also called 'profiles') and then detects behavior that deviates from the normal patterns outside a certain threshold. The anomaly detection is also referred to as a profile-based detection. For example, the anomaly detection may detect an action in which the rate of change of data included in the CAN message exceeds a normal range or two signals with high correlation are suddenly de-correlated in a specific period.

In the case of the anomaly detection, even when new unknown attacks appear, they can be detected if they deviate from the normal pattern, and the proportion of security human resources is less than that of the signature detection method. However, it requires a lot of system resources and may cause a false positive (type 1 error) problem that identifies normal activities under the set threshold as intrusions.

As described above, the detection ruleset is a set of predefined rules used by multiple detection techniques performed in the detection process to detect network messages related to security threats. The detection ruleset may include a misuse ruleset used for detecting misuse, a signature ruleset, and an abnormal ruleset.

Tables 1 to 3 show structures of exemplary detection rule-sets. Table 1 illustrates basic rulesets defined based on the CAN database, Table 2 illustrates a correlation coefficient map between signals, and Table 3 illustrates signatures, which are known attack patterns, used for signature detection. In Table 1, CAN ID, DLC, Signal ID, Signal value, and Bus ID may be used for misuse detection, and messages having values outside the ranges defined in Table 1 may be considered abnormal. Message rate, Signal value change rate, and Correlated Signal ID illustrated in Table 1 and the correlation coefficients between the signals illustrated in Table 2 may be used for anomaly detection.

TABLE 1

| CAN ID | DLC | Signal ID | Signal value | Bus ID | Message rate | Signal value change rate | Correlated Signal ID |
|---|---|---|---|---|---|---|---|
| 0x01 | 0x08 | 0x10 | 0x00~0xFF | 0x01 | 90 ms~100 ms | 10%~20% | 0x30 |
| 0x02 | 0x08 | 0x20 | 0x00~0x80 | 0x02 | 90 ms~100 ms | 10%~20% | — |
| ... | ... | ... | ... | ... | ... | ... | ... |

TABLE 2

| Signal ID | 0x01 | 0x02 | 0x03 | 0x04 | ... |
|---|---|---|---|---|---|
| 0x01 | 1 | 0.5 | 0.9 | 0.6 | ... |
| 0x02 | 0.5 | 1 | 0.7 | −0.9 | ... |
| 0x03 | 0.9 | 0.7 | 1 | −0.5 | ... |
| 0x04 | 0.6 | −0.9 | −0.5 | 1 | ... |
| ... | ... | ... | ... | ... | ... |

TABLE 3

| No | Signature pattern |
|---|---|
| 1 | ff 00 01 86 a5 |
| 2 | 75 05 a6 f5 a2 |
| 3 | 00 40 45 00 00 |
| 4 | ff 31 c3 77 45 65 c5 |
| ... | ... |

According to the operation illustrated in FIG. 3, for each message stacked in the message queue, it is determined whether to block or pass the message through the detection process including three detection techniques (i.e., the misuse detection→the signature detection→the anomaly detection). Accordingly, in the illustrated detection process, a normal CAN message is also delivered to the application software of the IDS-equipped gateway or ECU after passing the detection process including three techniques. In addition, if one of the detection techniques determines the CAN message as a security threat message, the application of the remaining detection techniques to the CAN message is bypassed.

Therefore, as the detection techniques with higher detection efficiency, lower required computing power and lower required time are applied first, the efficiency of the overall detection process will further increase. It is noted that the illustrated detection process is configured to first apply the techniques whose computing power and required time are expected to be low. Through the configuration of the detection process, it is possible to increase the efficiency of the overall detection process while maintaining robustness against the detection of malicious messages.

In the operation of the IDS illustrated in FIG. 3, all three detection techniques (i.e., the misuse detection, the signature detection, and the anomaly detection) are used in the detection process. However, depending on the location where the IDS is disposed, some of the three detection techniques may be omitted. For example, since a lot of computing power and time are required for the anomaly detection, only the misuse detection or only the misuse detection and the signature detection may be used in the detection process of the IDS embedded in the ECU. On the other hand, all three detection techniques may be used in the detection process of the IDS embedded in the (central/sub) gateway having relatively high computing power. As another example, all three detection techniques may be used in the central gateway, only the misuse detection and the signature detection are used in the sub gateway, and only the misuse detection may be used in the ECU.

Figure 4:
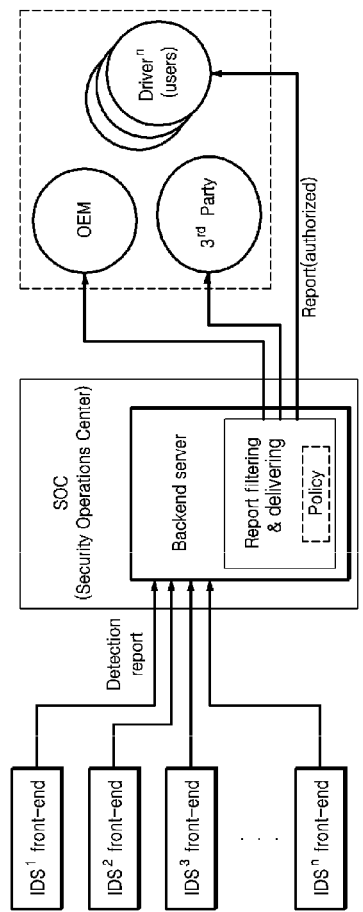
FIG. 4 is a conceptual diagram illustrating a method in which security events detected from vehicles are collected and distributed by a remote server according to one embodiment of the present disclosure.

FIG. 4 is a conceptual diagram illustrating a method in which security events detected from vehicles are collected and distributed by a remote server according to one embodiment of the present disclosure.

Each vehicle may transmit a security event detected in the IDS to a security operations center (SOC) that manages and analyzes security events. The IDS of each vehicle may generate a detection report. The detection report may be sent to the backend server of the secure operations center through a security channel to maintain confidentiality and integrity.

The detection report may include the following items:
Vehicle Identification Number (VIN)
Vehicle status at the time of event detection (e.g., vehicle speed provided from a transmission control unit, engine coolant temperature provided from an engine control unit, steering wheel angle provided from a body control unit, etc.)
Event timestamp (event date, event time)
Rule identifier (Rule ID) that identifies the detection rule related to the detected event
CAN ID obtained from a CAN message related to the detected event
Contents of the CAN message related to the detected event FIG. 5 illustrates a message format of an exemplary detection report that may be used in embodiments of the present disclosure.

Figure 5:
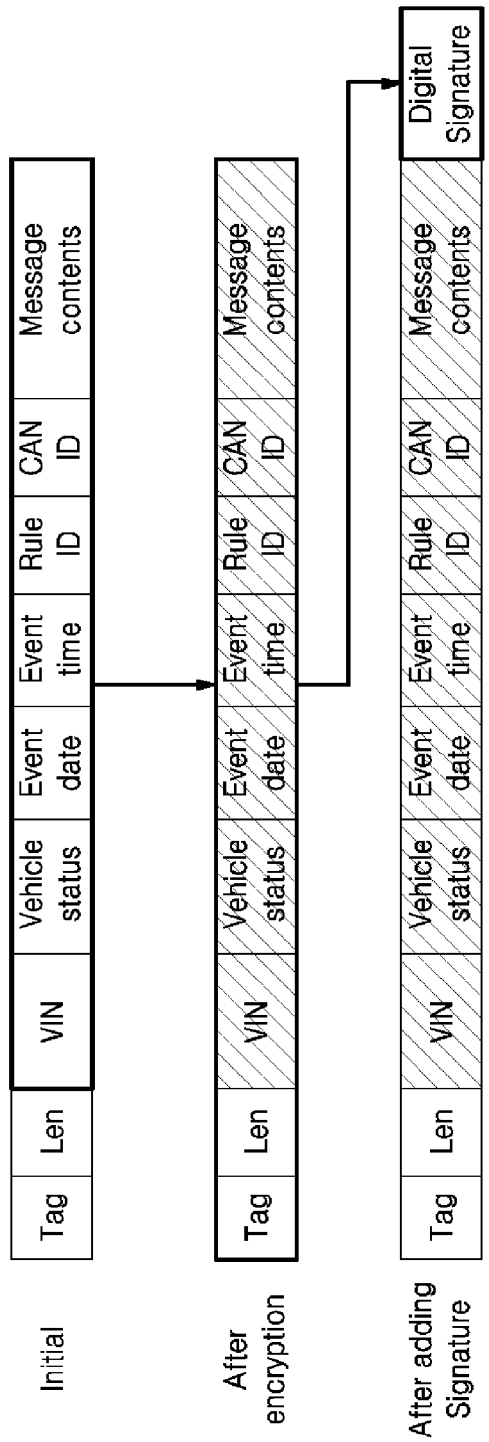
FIG. 5 illustrates a message format of an exemplary detection report that may be used in embodiments of the present disclosure.

As shown in FIG. 5, the detection report message may include fields of Tag, LEN, VIN, Vehicle status, Event date, Event time, Rule ID, CAN ID, and Message contents. In the detection report, data of fields other than the Tag field and the LEN field may be encrypted to ensure confidentiality of the data. The Tag field contains values for identifying this message as a detection report message, and the LEN field contains values for the data length of the to-be-encrypted fields (from the VIN field to the Message contents field), and may be used to parse each data item in the backend server of the security operations center. In addition, to ensure the integrity of the detection report, digital signatures may be generated for the entire fields including the tag field and the length data (LEN) field, to be added to the detection report.

The security operations center operates the backend server, including security information and an event management system, managed by a security expert, and may collect and statistically analyze security events generated by the IDS of each vehicle. The security operations center may provide collected detection reports and associated information (e.g., levels of security threats and recommended actions) to the interested parties with data access authority, such as vehicle manufacturers (OEMs), vehicle drivers, vehicle owners, and third parties. The third party may include an insurance company or a driving data analysis service provider.

The IDS may determine a severity score and a reliability score for the detected security events. The severity score is a value indicating how dangerous the security event is to the safety of the vehicle or driver. The severity score may be determined according to the importance level of a specific detection rule violated by the security event. The importance level of each detection rule may be predefined by a security expert. The reliability score is a value indicating the likelihood that the security event detected by the IDS is an actual attack. The reliability score is dynamically calculated whenever a violation of the detection rule is detected by the IDS and may be determined based on the degree of violation of the detection rule (e.g., deviation from the normal characteristics of the in-vehicle network). For example, when two suspicious messages are detected that violate the normal message transmission period, and the deviations of the transmission periods of the suspicious messages deviated from the normal message transmission period are 10 ms and 20 ms, respectively, the IDS may give a greater reliability score to the suspicious message with the 20 ms deviation than that with the 10 ms deviation. As another example, the IDS may assign a greater reliability score as data or the rate of change of the data included in the suspicious message further exceeds the normal range.

The IDS may determine an action for the security event based on the severity score and the reliability score. For example, when a security event with a high severity score that may seriously affect the safety of a vehicle is detected, the IDS may provide the driver with an alarm that recommends stopping the vehicle immediately. As another example, when security events having a low reliability score are consistently detected, the IDS may provide an alarm that recommends maintenance or inspection of the vehicle to the driver. As another example, when security events having a low severity score are detected, the detection results are recorded in a log, but no alarm may be provided to the driver. Frequent alarms for security events may cause the driver to overlook important alarms.

The IDS may prioritize the delivery order of detection reports based on the severity score and the reliability score of the relevant security event. The priority of the delivery order may be determined based on the severity score and the reliability score of the security event. For example, the priority may be determined arithmetically using the sum, weight, or average of the severity score and the reliability score. In some embodiments, the IDS forwards detection reports to the backend server in the order in which relevant security events are detected, and when a plurality of security events are detected in a short period of time, the relevant detection reports may be delivered to the backend server in the security operations center according to the priority of the detected security events.

The IDS may determine the delivery timing of detection reports based on the severity score and the reliability score or the priority of the relevant security event. For example, the IDS may forward detection reports to the backend server in the security operations center in real time (i.e., immediately after detection) for a security event with calculated priority (or severity score) higher than a predefined value, and forward detection reports to the backend server in the security operations center in non-real time (i.e., during idle time) for a security event with calculated priority (or severity score) equal to or lower than the predefined value.

The above-described reporting methods enable rapid response to threatening attacks in a vehicle environment with limited processing power and limited network bandwidth.

For example, by determining the order of delivery of detection reports based on priorities, the occurrence of high-priority (i.e., threatening) attacks can be notified more quickly to the security operations center, so that the security operations center may quickly guide the driver and the like to get out of the threatening situation. A simple method of sequential reporting of attacks occurring in a vehicle regardless of the degree of threat may delay reporting on threatening attacks due to reporting of events with no significant threat, which may significantly deteriorate the driver's response to the threat.

In some embodiments, the IDS may determine whether to omit the delivery of the detection report to the backend server of the security operations center based on the severity score, reliability score, or priority. For example, the IDS of the vehicle may omit the delivery of the detection report for a security event having a severity score lower than a predefined value. As another example, for security events with a severity score higher than the predefined value, the detection report may be forwarded to the backend server of the security operations center regardless of the reliability score. In some embodiments, for security events with a severity score lower than the predefined value, the IDS may send summarized detection information for the events to the backend server instead of the detection report in the above-described format. This enables efficient use of the vehicle's limited resources and may reduce the load on the backend server that needs to receive detection reports from a plurality of vehicles.

It should be understood that the above-described exemplary embodiments may be implemented in many different ways. In some examples, the various methods, devices, and systems described in the present disclosure may be implemented by or included in an electronic control device, a gateway, or the like having a processor, a memory, a communication interface, and the like. For example, the electronic control device may function as a device that executes the above-described method by loading software instructions into the processor and then executing the instructions to perform the functions described in embodiments of the present disclosure.

Meanwhile, various methods described in the present disclosure may be implemented with instructions stored in a non-transitory recording medium that may be read and executed by one or more processors. The non-transitory recording medium includes, for example, all types of recording devices in which data is stored in a form readable by a computer system. For example, the non-transitory recording medium includes a storage medium such as erasable programmable read-only memory (EPROM), electrically erasable programmable read-only memory (EEPROM), flash memory, optical drive, magnetic hard drive, and solid state drive (SSD).

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An intrusion detection system for detecting intrusions in an in-vehicle network, the intrusion detection system being equipped in a vehicle and implemented by one or more processors, the system comprising:

a message queue module configured to store network messages collected from the in-vehicle network in a message queue;

a memory configured to securely store a ruleset comprising a set of detection rules used in a plurality of detection techniques;

a rule engine configured to apply the plurality of detection techniques to the collected network messages to detect security events and configured to determine a severity score and a reliability score for each detected security event; and an interface manager configured to transmit detection reports to a remote backend server on a remote network in response to detection of the security events, wherein the interface manager is configured to:

transmit the detection reports to the remote backend server in an order of detection of the security events;

when a plurality of security events are detected in a predefined period of time, determine a priority for each security event based on the severity score and the reliability score; and transmit a detection report for each security event to the remote backend server according to the priority.

2. The intrusion detection system of claim 1, wherein the severity score comprises a value indicating how dangerous a relevant security event is to safety of the vehicle or a driver, and wherein the severity score is determined based on a predefined importance level for the detection rule that succeeded in detecting the relevant security event.

3. The intrusion detection system of claim 1, wherein the reliability score comprises a value indicating a likelihood that a relevant security event is an actual attack, and wherein the reliability score is determined based on a difference between characteristics of the relevant security event and normal characteristics of the in-vehicle network.

4. The intrusion detection system of claim 3, wherein, for security events in which network messages are transmitted on the in-vehicle network at a period different from a normal transmission period, the reliability score is determined based on a deviation from the normal transmission period.

5. The intrusion detection system of claim 1, wherein the rule engine is further configured to determine an action for a relevant security event based on the severity score and the reliability score.

6. The intrusion detection system of claim 1, wherein the interface manager is configured to determine whether to omit transmission of a detection report for a relevant security event based on the severity score and the reliability score.

7. An intrusion detection system for detecting intrusions in an in-vehicle network, the intrusion detection system being equipped in a vehicle and implemented by one or more processors, the system comprising:

a message queue module configured to store network messages collected from the in-vehicle network in a message queue;

a memory configured to securely store a ruleset comprising a set of detection rules used in a plurality of detection techniques;

a rule engine configured to apply the plurality of detection techniques to the collected network messages to detect security events and configured to determine a severity score and a reliability score for each detected security event; and an interface manager configured to transmit detection reports to a remote backend server on a remote network in response to detection of the security events, wherein the interface manager is configured to:

prioritize relevant security events based on the severity score and the reliability score;

forward the detection reports to the remote backend server in real time for security events with a priority higher than a predefined value; and forward the detection reports to the remote backend server during an idle time for security events with a priority equal to or lower than the predefined value.

8. The intrusion detection system of claim 7, wherein the severity score comprises a value indicating how dangerous a relevant security event is to safety of the vehicle or a driver, and wherein the severity score is determined based on a predefined importance level for the detection rule that succeeded in detecting the relevant security event.

9. The intrusion detection system of claim 7, wherein the reliability score comprises a value indicating a likelihood that a relevant security event is an actual attack, and wherein the reliability score is determined based on a difference between characteristics of the relevant security event and normal characteristics of the in-vehicle network.

10. The intrusion detection system of claim 9, wherein, for security events in which network messages are transmitted on the in-vehicle network at a period different from a normal transmission period, the reliability score is determined based on a deviation from the normal transmission period.

11. The intrusion detection system of claim 7, wherein the rule engine is further configured to determine an action for a relevant security event based on the severity score and the reliability score.

12. The intrusion detection system of claim 7, wherein the interface manager is configured to determine whether to omit transmission of a detection report for a relevant security event based on the severity score and the reliability score.

13. A method for detecting intrusion in an in-vehicle network, the method being performed by one or more processors included in an intrusion detection system equipped in a vehicle and comprising:

storing network messages collected from the in-vehicle network in a message queue;

applying a plurality of detection techniques to the collected network messages to detect security events, the plurality of detection techniques using a ruleset comprising a set of detection rules;

determining a severity score and a reliability score for each detected security event; and transmitting detection reports to a remote backend server in response to detection of the security events, wherein the detection reports are transmitted to the remote backend server in an order of detection of the security events and, when a plurality of security events are detected during a predefined period of time, a priority for each security event is determined based on the severity score and the reliability score, and wherein the detection reports for the respective security events are transmitted to the remote backend server according to the priority.

14. The method of claim 13, wherein the severity score comprises a value indicating how dangerous a relevant security event is to safety of the vehicle or a driver, and wherein the severity score is determined based on a predefined importance level for the detection rule that succeeded in detecting the relevant security event.

15. The method of claim 13, wherein the reliability score comprises a value indicating a likelihood that a relevant security event is an actual attack, and wherein the reliability score is determined based on a difference between characteristics of the relevant security event and normal characteristics of the in-vehicle network.

16. The method of claim 15, wherein, for security events in which network messages are transmitted at a period different from a normal transmission period, the reliability score is determined based on a deviation from the normal transmission period.

17. The method of claim 13, further comprising determining an action for a relevant security event based on the severity score and the reliability score.

18. The method of claim 13, further comprising determining whether to forward the detection reports for relevant security events to the remote backend server in real time, with priorities determined based on the severity score and the reliability score, wherein a detection report for a security event having a priority higher than a predefined value is forwarded to the remote backend server in real time, and a detection report for a security event having a priority equal to or lower than the predefined value is forwarded to the remote backend server during an idle time.

19. The method of claim 13, further comprising determining whether to omit transmission of the detection report for a relevant security event based on the severity score and the reliability score.

* * * * *

UNITED STATES PATENT AND TRADEMARK OFFICE
CERTIFICATE OF CORRECTION

PATENT NO. : 12,335,278 B2  
APPLICATION NO. : 17/799534  
DATED : June 17, 2025  
INVENTOR(S) : Kim et al.

Page 1 of 1

It is certified that error appears in the above-identified patent and that said Letters Patent is hereby corrected as shown below:

In the Claims

In Column 10, in Claim 1, Line 67, before "processors," insert -- hardware --.

In Column 11, in Claim 7, Line 54, before "processors," insert -- hardware --.

In Column 12, in Claim 13, Line 41, before "processors" insert -- hardware --.

Signed and Sealed this  
Twenty-second Day of July, 2025

Coke Morgan Stewart  
*Acting Director of the United States Patent and Trademark Office*